Patented June 26, 1945

2,379,252

UNITED STATES PATENT OFFICE 2,379,252

CARBONIC ACID ESTERS

Irving E. Muskat, Akron, and Franklin Strain, Norton Center, Ohio, assignors to Pittsburgh Plate Glass Company, Pittsburgh, Pa., a corporation of Pennsylvania No Drawing. Application October 4, 1941, Serial No. 413,644

5 Claims. (Cl. 260—463)

This invention relates to a novel class of compounds which have been found to have many desirable properties. In accordance with the present invention, we have prepared a novel class of esters which are esters of (a) an ether alcohol which contains one or more ether linkages between a pair of hydroxyl groups and (b) a half ester of carbonic acid and a saturated alcohol.

The invention is particularly directed to esters of polyglycols, particularly of the alkylene glycols such as di-, tri-, tetra-, penta-, or hexaethylene glycol, di-, tri-, or tetra-propylene glycol, dibutylene glycol, tributylene glycol, or the polyglycols of trimethylene glycol, or pentamethylene glycol, etc. In addition, esters of other ether alcohols such as polyglycerols, dioxane diols such as 1,4-dioxane diol-2,3, or the compound

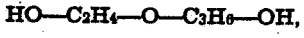
HO—C₂H₄—O—C₃H₆—OH, or the corresponding ether alcohols derived from the higher alcohols including methyl glycerol, mannitol, etc. may be prepared. Moreover, esters of polyhydroxy aromatic ethers such as p,p-dihydroxy diphenyl ether, bis (hydroxy benzyl) ether, or hydroxy cumaron, etc. may be prepared.

The compounds herein contemplated may be esters of various saturated monohydric alcohols such as methyl, ethyl, propyl, butyl, amyl, hexyl, lauryl, or stearyl alcohols or secondary or tertiary alcohols such as secondary or tertiary butyl alcohols, isopropyl alcohol, pentanol-3, pentaol-3, or aromatic or araliphatic alcohols such as β-phenyl ethyl alcohol, benzyl alcohol, phenyl methyl carbinol, cyclohexanol, cyclopentanol, or the halogen or other substitution products of the above alcohols such as chloromethyl, chloropropyl, chlorobenzyl, or chlorobutyl alcohols. In addition, esters may be prepared from ether alcohols containing a single alcoholic hydroxyl group such as the mono ethyl ether of ethylene glycol, the monomethyl ether of ethylene glycol, or other alkenyl or alkynyl or other corresponding alkyl ethers such as propyl, butyl, lauryl, allyl, propargyl, methallyl, oleyl, phenyl, etc., or the corresponding mono ethers of other glycols such as the propylene or butylene glycols or the above mentioned polyglycols.

Both polyesters and monoesters of these polyglycols may be prepared. Thus, the compounds will have a general formula:

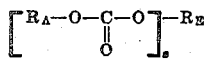

in which $R_A$ is the radical derived from a saturated alcohol and $R_E$ is the portion of the polyhydroxy ether molecule in which $x$ hydroxy groups are esterified with the radical indicated in parenthesis. Such compounds in general contain a single radical $R_E$ in each molecule of the compound.

In the case of the monoesters the remaining hydroxyl group or groups may be free or etherified or esterified by other acids, for example, acetic, butyric, stearic, oleic, acids, etc.; monomethyl phthalate, monomethyl succinate, monomethyl adipate, or alcohols such as methyl, ethyl, allyl, propyl, methallyl, oleyl, or lauryl alcohols, etc. Such monoesters may be prepared, for example, by reacting a monohydroxy ether or ester of a polyglycol with a chloroformate of a saturated alcohol. Suitable monohydroxy ethers are the monoacetate of diethylene glycol, dipropylene glycol monoacetate, triethylene glycol monoacetate, etc., and the corresponding acrylates, propionates, oleates, butyrates, stearates, propiolates, etc., the monomethyl ether of diethylene glycol, or the corresponding monoamyl, monoethyl, monoallyl, etc. ethers of polyhydroxy ethers.

The polyesters of polyhydroxy ethers (especially the dihydroxy ethers) and the partial ester of a saturated alcohol and carbonic acid are of particular interest. The polyesters of the dihydroxy ethers have the following general structure:

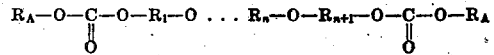

in which $R_A$ is the radical derived from saturated alcohol and $R_1 \ldots R_n$ and $R_{n+1}$ are the hydrocarbon or substituted hydrocarbon radicals of which the polyhydroxy ether is constituted.

The polyesters may be prepared by reaction of the dichloroformate of the polyglycol such as diethylene glycol dichloroformate with the desired alcohol. Both mono and polyesters may be prepared by reaction of the chloroformate of the alcohol with the polyglycol. In general, substantially theoretical amounts of the reactants are used in the production of the various esters. The reaction may be promoted by the presence of an alkaline reagent. For this purpose, organic bases such as trimethylphenyl ammonium hydroxide, or inorganic bases such as the oxides, hydroxides, and carbonates of sodium, potassium, calcium, barium, strontium, and magnesium or other alkaline earth metal, or alkali metal are useful. The alkaline agent may be in solution or may be dispersed as a finely pulverized solid material.

Thus, finely divided calcium carbonate has been found to be effective.

Water may be present or the reaction may be conducted under substantially anhydrous conditions. It may, under some circumstances, be desirable to add diluents such as water, acetone, carbon tetrachloride, or dioxane.

The temperature of the reaction will depend upon the nature of the alkaline reagent used. When pyridine or caustic soda is used, temperatures less than normal room temperature (15–25° C.) may be used since such lower temperatures generally favor higher yields. When calcium carbonate is used as the alkaline reagent, it is desirable to operate at higher temperatures, preferably above 50° C. The effect of reduced yields can be compensated by controlling the concentration of reactants, thus, by using an excess of both alcohol and alkaline reagent, almost quantitative yields can be obtained in many cases. When operating under such circumstances, the excess of reagents may be recovered and used in subsequent preparations.

The esters are generally high boiling liquids although in some cases they may be solids. The liquids are particularly interesting since they have very high boiling points and yet possess very low viscosities. They are compatible with many organic solvents such as acetone, ethyl alcohol, xylene, toluene, benzene, chloroform, etc. They are, in general, substantially insoluble in water. Most of these liquids are colorless and possess a faintly sweet odor.

These compounds herein described are capable of wide use as solvents and plasticizers. They are found to be particularly effective as plasticizers for synthetic resins and plastics such as cellulose esters or ethers including cellulose acetate, nitrate or acetobutyrate, ethyl or methyl cellulose, vinyl resins including vinyl acetate, vinyl chloride, styrene, and acrylic polymers or the butadiene polymers such as copolymers of butadiene with various materials such as styrene or acrylonitrile. Synthetic rubber compositions of this type plasticized with these esters may be vulcanized at an elevated temperature without loss of plasticizer or formation of a bubbled or a porous product due to vaporization of the plasticizer.

The following examples are illustrative:

Example I

A 25 percent excess of 50 percent sodium hydroxide (634 gms.) was sprayed into a rapidly stirred mixture of 732 gms. of diethylene glycol bis chloroformate and 586 gms. of n-butyl alcohol. The temperature was maintained between 15 and 20° C. by cooling. The sodium hydroxide was added over a period of 35 minutes and after the addition was completed the mixture was stirred for on hour. The ester was washed with one liter of water and heated to 150° C. at 15 mm. with 1 gram of activated charcoal for one-half hour. The diethylene glycol bis (n-butyl carbonate) was distilled at 175–180° C. at 3 mm. total pressure. The material was found to have a density of about 1.097 at 20° C. and an index of refraction of about 1.4470.

Example II

A mixture of 230 gms. of triethylene glycol dichloroformate, 120 gms. of n-propyl alcohol, 1000 cc. of benzene and 150 gms. of finely divided calcium carbonate was placed in a two-liter flask. The mixture was refluxed for two hours. The resulting ester was washed with dilute $Na_2CO_3$ solution and with water and finally dried over $Na_2SO_4$. The triethylene glycol bis (propyl carbonate) was decolorized by heating with activated charcoal and was purified by distillation. A colorless liquid was secured.

Example III

A mixture of 130 gms. of dipropylene glycol and 200 gms. of pyridine was cooled to 0° C. on an ice bath. 200 gms. of ethyl chloroformate, prepared by reacting ethyl alcohol with phosgene, was added slowly at a rate which permitted the temperature to remain below 10° C. The reagents were completely mixed in one hour. After removing from the ice bath the mixture was allowed to stand for two hours. The ester was washed with water and distilled with 1 gram of activated charcoal. The ester is a colorless liquid having the following probable structure:

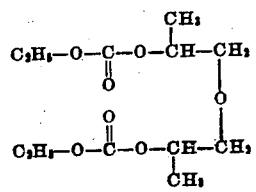

Example IV

A mixture of 50 gms. of methyl alcohol and 107 gms. of pyridine was prepared in a flask equipped with reflux condenser and with a stirring mechanism. 106 gms. of diethylene glycol dichloroformate was added slowly over a period of about two hours. During the reaction the temperature was maintained at 5 to 15° C. The reaction product was washed with dilute hydrochloric acid and then with dilute sodium carbonate solution. Thereafter, the product was decolorized by heating with activated charcoal. Pure diethylene glycol bis (methyl carbonate) was produced. This ester is a colorless liquid which boils at about 140–148° C. at 3 millimeters of mercury and has a density of about 1.244 at 20° C. and an index of refraction of about 1.4370.

Example V

The procedure of Example I was used except butyl cellosolve was used in place of n-butyl alcohol. The ester thus obtained had a boiling point of about 240–260° C. at 2 mm., a density of about 1.072 at 20° C. and an index of refraction of about 1.4405. This ester is a colorless liquid having the following probable structure:

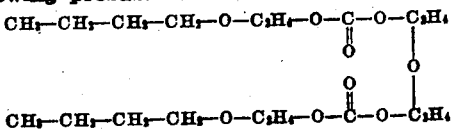

Example VI

The procedure of Example I was repeated except that phenyl cellosolve was used in place of n-butyl alcohol. A solid ester having a melting point of 62° C. and an index of refraction while supercooled at 70° C. of 1.5310 was obtained. The probable structure of this compound is as follows:

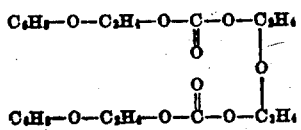

The following table sets forth the approximate boiling point of a number of the esters herein contemplated:

| Compound | Boiling point | |
|---|---|---|
| | Temp., °C. | Pressure mm. Hg |
| Diethylene glycol bis (ethyl carbonate) | 138–148 | 2 |
| Diethylene glycol bis (n-propyl carbonate) | 150–155 | 2 |
| Diethylene glycol bis (n-amyl carbonate) | 180–185 | 2 |
| Diethylene glycol bis (butyl cellosolve carbonate) | 240–260 | [1] 2 |
| Diethylene glycol bis (2-chloroethyl carbonate) | 185–190 | 2 |
| Diethylene glycol bis (tetrahydrofurfuryl carbonate) | 240–250 | [1] 2 |

[1] Decomposes during distillation.

This invention is a continuation-in-part of copending application Serial No. 385,772, filed March 28, 1941, by Irving E. Muskat and Franklin Strain.

Although the invention is described with respect to certain specific details, it is not intended that such details shall be limitations upon the scope of the claims except as expressly included in the following claims.

We claim:

1. A neutral diester of (a) a polyglycol and (b) two molecules of an acid ester of carbonic acid and a saturated aliphatic alcohol.

2. A neutral diester of (a) a polyethylene glycol and (b) an acid ester of carbonic acid and a saturated aliphatic alcohol said ester having both hydroxy groups of the glycol esterified with the acid ester.

3. Diethylene glycol bis (ethyl carbonate).

4. Triethylene glycol bis (ethyl carbonate).

5. Triethylene glycol bis (butyl carbonate).

IRVING E. MUSKAT.
FRANKLIN STRAIN.